United States Patent
Frost et al.

(10) Patent No.: US 8,389,167 B2
(45) Date of Patent: *Mar. 5, 2013

(54) DETECTION OF CELL-TO-CELL VARIABILITY IN WATER HOLDUP USING PATTERN RECOGNITION TECHNIQUES

(75) Inventors: Patrick Frost, Sterling Heights, MI (US); Manish Sinha, Pittsford, NY (US); Jason R. Kolodziej, West Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2085 days.

This patent is subject to a terminal disclaimer.

(21) Appl. No.: 11/467,585

(22) Filed: Aug. 28, 2006

(65) Prior Publication Data

US 2008/0050620 A1    Feb. 28, 2008

(51) Int. Cl.
*H01M 8/06*    (2006.01)
*H01M 8/04*    (2006.01)

(52) U.S. Cl. .................. 429/414; 429/432; 429/443

(58) Field of Classification Search ............. 429/12–46, 429/400–535
See application file for complete search history.

(56) References Cited

U.S. PATENT DOCUMENTS

| | | | | |
|---|---|---|---|---|
| 5,945,229 | A * | 8/1999 | Meltser ........................... | 429/13 |
| 2003/0022042 | A1 * | 1/2003 | Wells et al. ..................... | 429/23 |
| 2004/0157103 | A1 * | 8/2004 | Takeguchi et al. .............. | 429/32 |
| 2007/0048557 | A1 * | 3/2007 | Sinha .............................. | 429/13 |

FOREIGN PATENT DOCUMENTS

| | | |
|---|---|---|
| CN | 1513217 A | 7/2004 |
| CN | 1624490 A | 6/2005 |
| JP | 8266477 | 10/1996 |
| JP | 2005-149741 | 6/2005 |
| JP | 2005-251517 | 9/2005 |
| WO | WO 0203086 A2 | 1/2002 |
| WO | 03/010842 A2 | 2/2003 |

OTHER PUBLICATIONS

Martin et al., Application of pattern recognition to the discrimination of roasted coffees, Feb. 1996, Analytica Chimica Acta, vol. 320, pp. 191-197.*

* cited by examiner

*Primary Examiner* — Basia Ridley
*Assistant Examiner* — Jonathan G Leong
(74) *Attorney, Agent, or Firm* — John A. Miller; Miller IP Group, PLC

(57) ABSTRACT

A system and method for preventing low performing cells in a fuel cell stack. The method includes periodically providing a pulse of the cathode input airflow at low stack current densities, and comparing the current density output of each cell in response to the pulse. Those cells that do not have significant water accumulation will provide one voltage signature and those cells that do have a significant water accumulation will provide another voltage signature. If one or more of the cells exhibit the voltage signature for water accumulation, then the cathode inlet airflow pulses can be provided more often to prevent the cells from failing.

20 Claims, 3 Drawing Sheets

DETECTION OF CELL-TO-CELL VARIABILITY IN WATER HOLDUP USING PATTERN RECOGNITION TECHNIQUES

BACKGROUND OF THE INVENTION

1. Field of the Invention

This invention relates generally to a system and method for preventing water build-up in the cathode flow channels of a fuel cell stack using cell voltage pattern recognition and, more particularly, to a system and method for periodically providing pulsed cathode air flow to the cathode side of a fuel cell stack at low stack current power density to determine the pattern of the cell voltages during the pulses to prevent water build-up in the cathode flow channels.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs require certain conditions for effective operation, including proper water management and humidification.

Several fuel cells are typically combined in a fuel cell stack to generate the desired power. For the automotive fuel cell stack mentioned above, the stack may include about two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below $0.2$ $A/cm^2$, water accumulates within the flow channels because the flow rate of the reactant gas is too low to force the water out of the channels. As the water accumulates, it forms droplets that continue to expand because of the relatively hydrophobic nature of the plate material. The contact angle of the water droplets is generally about 80°-90° in that the droplets form in the flow channels substantially perpendicular to the flow of the reactant gas. As the size of the droplets increases, the flow channel is closed off, and the reactant gas is diverted to other flow channels because the channels are in parallel between common inlet and outlet manifolds.

Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

Low performing cells, especially at low stack power output, is a problem in fuel cell applications. Low performing cells typically produce more water than other cells, and can lead to flow channel flooding. One flooded cell can start a downward spiral of operation that may ultimately lead to stack failure, especially during low-power operation. As discussed above, the most common cause of low performing cells and fuel cell stack failure is significant cell-to-cell variation as a result of water holdup caused by stochastic variations in gas behavior dynamics.

It is usually possible to purge the accumulated water in the flow channels by periodically forcing or pulsing the reactant gas through the flow channels at a higher flow rate than is necessary to provide the desired output power. For example, it is known in the art to pulse the cathode air through the flow channels when the fuel cell stack has been continuously operating at low power demands, such as would occur when the vehicle is idling for an extended period of time. For example, the cathode air may be pulsed to a level for half stack power every 3-5 minutes. By pulsing the cathode air in this manner, water is forced out of the channels. However, the increased airflow dries the membranes causing problems with expansion and shrinkage of the membrane. Also, an increased airflow increases the parasitic power applied to the air compressor, thereby reducing overall system efficiency. Further, this technique often comes too late to prevent the cell from failing.

The division of gases into a large number of cells is seldom equal. The cells that receive less gas will see a higher relative humidity and the cells with more gas will have a lower relative humidity. If a cell's relative humidity increases above 100%, water will collect in the cathode flow field channels, further decreasing air flow and compounding the problem until the cell fails or the water is removed.

SUMMARY OF THE INVENTION

In accordance with the teachings of the present invention, a system and method are disclosed for preventing low performing cells in a fuel cell stack. The method includes periodically providing a pulse of cathode input airflow at low stack current densities, and comparing the voltage output of each cell in response to the pulse. Those cells that do not have significant water accumulation will provide one voltage signature and those cells that do have a significant water accumulation will provide another voltage signature. If one or more of the cells exhibit the voltage signature for water accumulation, then the cathode inlet airflow pulses can be provided more often to prevent the cells from failing.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining low performing cells in a fuel cell stack based on pattern recognition of voltage outputs of the fuel cells is merely exemplary in nature, and is in no way intended to limit the invention or its applications or uses.

Figure 1:
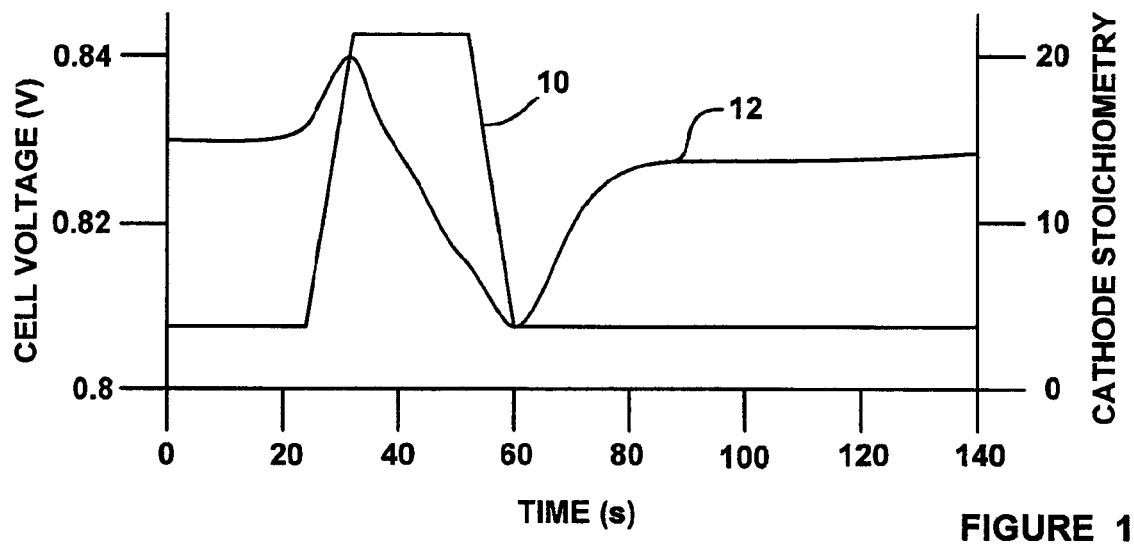
FIG. 1 is a graph with time on the horizontal axis, cell voltage on the left vertical axis and cathode stoichiometry on the right vertical axis showing a voltage signature of a fuel cell that does not have significant water build-up in the cathode flow channels in response to a cathode inlet air pulse.

The present invention proposes using cell voltage output pattern recognition to determine whether one or more cells in a fuel cell stack is low performing, so as to prevent stack failure. FIG. 1 is a graph with time on the horizontal axis, cell voltage on the left vertical axis and cathode stoichiometry on the right vertical axis. Graph line 10 represents a pulse of cathode input air from time equal to about 21 to time equal to about 60. During this time, the cathode stoichiometry goes from about 3 to about 20, where a cathode stoichiometry of about 3 represents the cathode stoichiometry for a low stack current density, typically less than 0.2 A/cm$^2$. Graph line 12 represents a voltage output of one cell in the fuel cell stack, where the cathode flow channels of the fuel cell are not significantly hydrated. At the initiation of the pulse of cathode air flow, the cell voltage goes up from about 0.83 to about 0.84 volts as a result of more reactant gas. At some short period of time thereafter, the cell voltage begins to decrease during the cathode inlet air pulse as a result of the membrane drying from the airflow without significant product water being generated. Once the pulse ends, the drying effect of the cathode inlet air is reduced, and the cell voltage returns to the 0.83 voltage.

Figure 2:
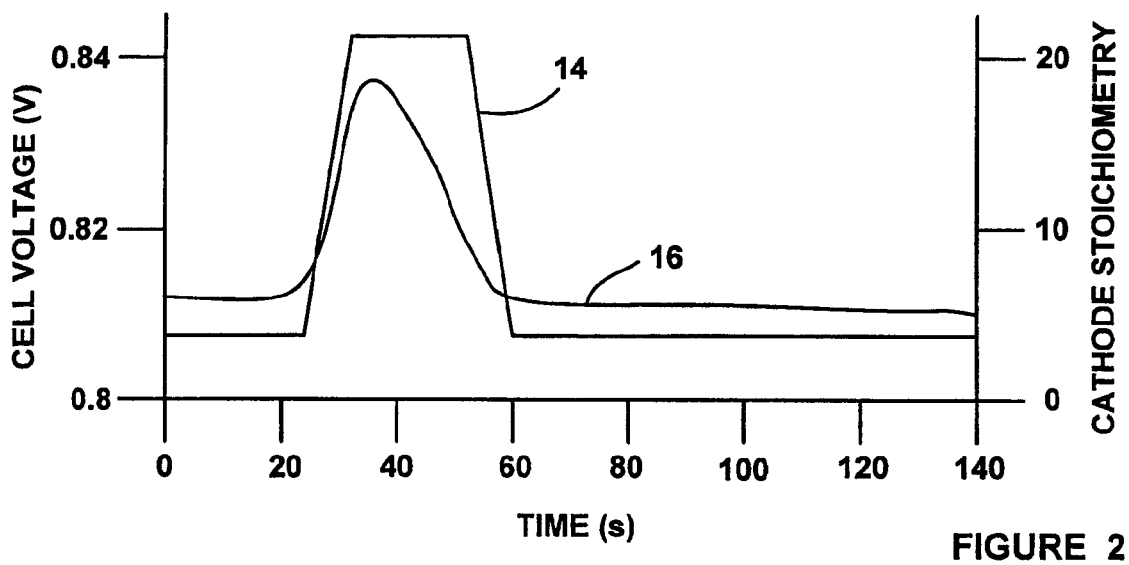
FIG. 2 is a graph with time on the horizontal axis, cell voltage on the left vertical axis and cathode stoichiometry on the right vertical axis showing a voltage signature of a fuel cell that includes significant water build-up in the cathode flow channels in response to a pulse of cathode inlet air.

FIG. 2 is a graph with time on the horizontal axis, cell voltage on the left vertical axis and cathode stoichiometry on the right vertical axis. The same cathode inlet air pulse is shown at graph line 14. Graph line 16 represents the voltage output of a fuel cell that has significant hydration in the cathode flow channels. Because of the hydration, the voltage of the cell increases at the initiation of a pulse from about 0.81 to about 0.83 volts as a result of the cathode inlet airflow driving water out of the flow channels so that the reactant gas can get to the membrane. Once the cell voltage reaches a certain maximum, it begins to decline during the pulse as a result of the drying of the membrane. Once the pulse is removed, the low performing cell goes back to a steady state value at about 0.81 volts.

The voltage signatures of graph lines 12 and 16 are readily visually distinguishable from each other. The present invention makes use of pattern recognition techniques to distinguish the voltage signatures of the cell voltages to determine low performing cells, which allows for integration into the control system as an online diagnostics to automatically detect and remedy abnormalities in cell flooding. Any suitable pattern recognition algorithm that is able to distinguish slight differences in voltage signals can be used. The pattern recognition algorithm would analyze each cell's voltage signature in relation to other cells in the fuel cell stack. If any cells are found to be non-uniform, remedial actions can be taken to prevent cell failure.

Figure 3:
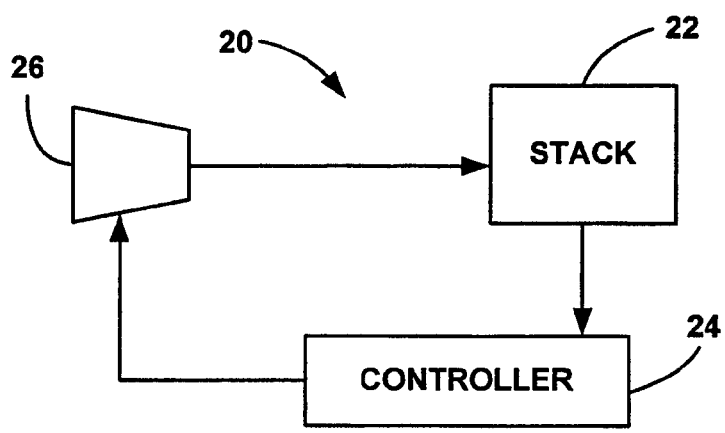
FIG. 3 is a simplified block diagram of a fuel cell system.

FIG. 3 is a simplified block diagram of a fuel cell system 20 including a fuel cell stack 22, a controller 24 and a compressor 26. The compressor 26 applies airflow to the input of the cathode side of the stack 22. As will be discussed in detail below, the controller 24 employs a pattern recognition algorithm that pulses the speed of the compressor 26 and analyzes the voltage signature of each fuel cell in the stack 22 to identify failing fuel cells early enough so that a remedial action can be taken before the cell fails, such as providing a greater flow of compressor air to clear the cathode flow channels of water.

According to the invention, one pattern recognition technique that can be used is known as Spearman rank correlation. Like standard statistical correlation, Spearman rank correlation is a measure of data similarity. The main difference in Spearman rank correlation is due to the ranking of data points to give a bigger focus on the shape of the data. The ranked data points are then correlated to return a measure of shape similarity. Spearman rank correlation more clearly shows differences in shape, and thus is useful for pattern recognition. Slight differences that do not show up with standard correlation techniques are visible with Spearman rank correlation.

Figure 4:
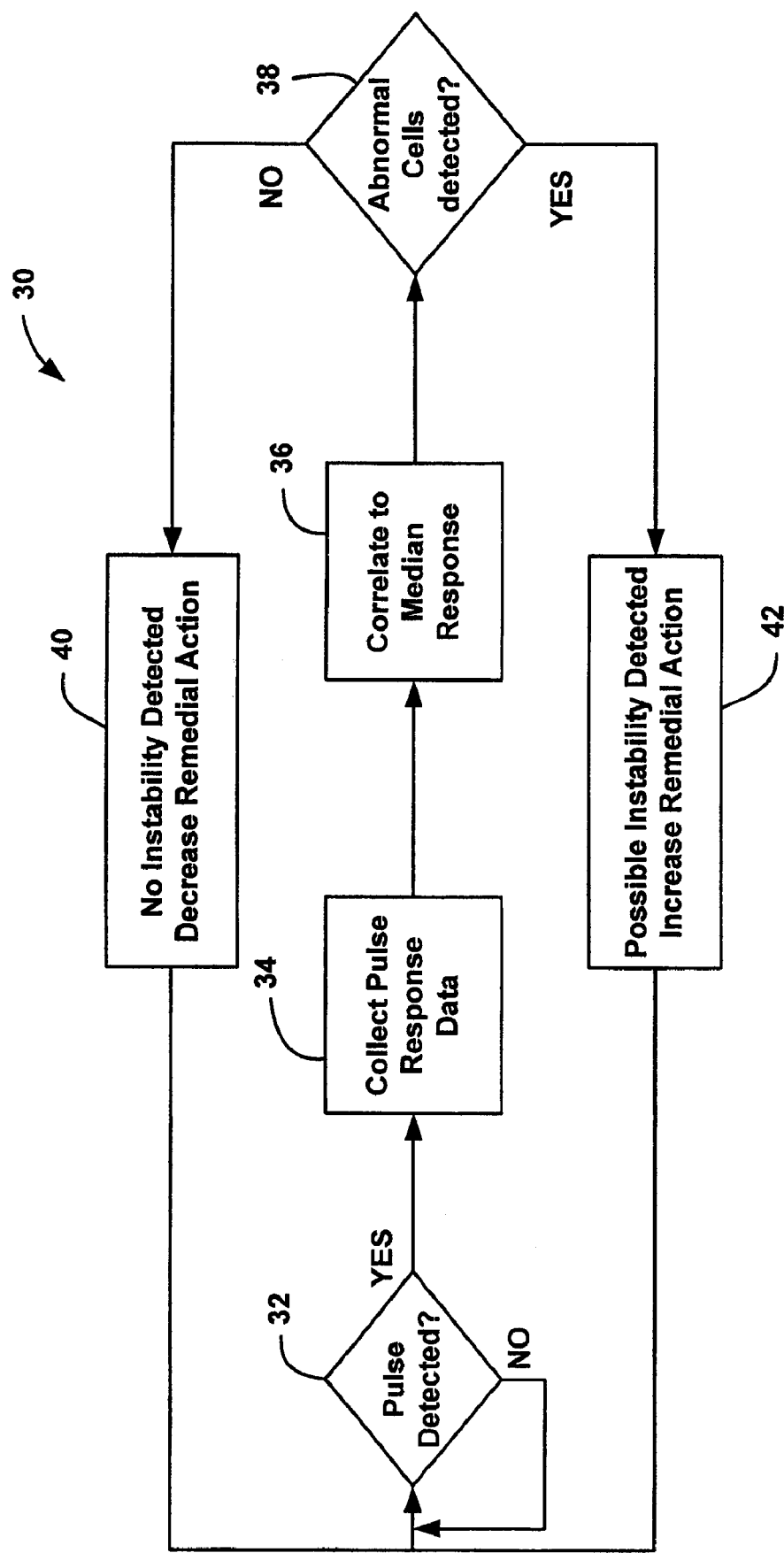
FIG. 4 is a flow chart diagram showing a process for using a Spearman rank correlation pattern recognition algorithm for determining how often to provide cathode inlet air pulses to prevent cell failure, according to an embodiment of the present invention.

FIG. 4 is a flow chart diagram for an algorithm using Spearman rank correlation for pattern recognition in the controller 24 to determine whether a remedial action needs to be taken in response to low performing cells in the fuel cell stack 22. The algorithm determines whether a pulse of the cathode airflow from the compressor 26 is detected at decision diamond 32. The algorithm is designed to provide pulses of the cathode inlet air at low stack current density every predetermined period of time, such as every minute, assuming that no low performing cell is detected.

If a pulse is detected at the decision diamond 32, then the algorithm uses Spearman rank correlation for pattern recognition. The algorithm collects pulse response voltage output data for each cell in the stack 22 at box 34. For example, the pattern recognition algorithm will collect voltages of each cell during a predetermined time at the initiation of the pulse and for some time thereafter, for example, 80 seconds, to include the complete voltage signature pattern shown in FIGS. 1 and 2. The pattern recognition algorithm then correlates the data points to a median response voltage signature for all of the cells at box 36. The algorithm then compares the median voltage signature to all of the voltage signatures for each cell at decision diamond 38 to determine whether any of the voltage signatures do not match the median signature. If none of the cells appear to be abnormal, then the algorithm either decreases the pulsing of the cathode inlet airflow or maintains the predetermined rate of pulsing the cathode airflow at box 40. However, if an abnormal cell is detected at the decision diamond 38, then the algorithm increases the pulses of the cathode inlet airflow at box 42 to drive the water out of the cathode flow channels before any of the cells fail.

Figure 5:
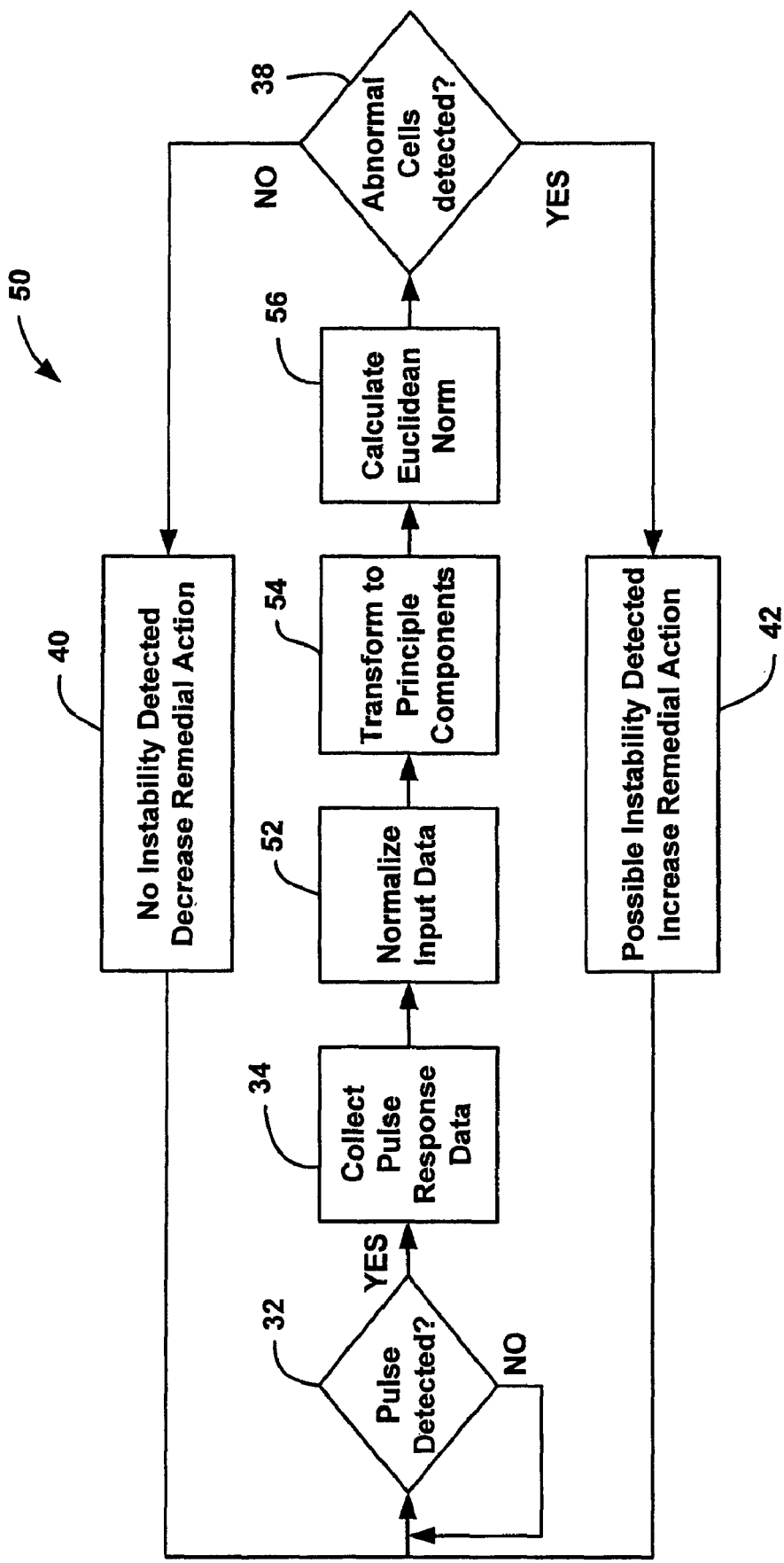
FIG. 5 is a flow chart diagram showing a process for using a principle component analysis pattern recognition algorithm for determining how often to provide cathode inlet air pulses to prevent cell failure, according to another embodiment of the present invention.

According to another embodiment of the present invention, principle component analysis (PCA) is used for the pattern recognition algorithm to monitor the voltage signatures of the cells in the stack 22. FIG. 5 is a flow chart diagram 50 showing a process for detecting abnormal cells using the PCA pattern recognition algorithm, where like steps to the flow chart diagram 30 are identified by the same reference numeral. The PCA pattern recognition algorithm normalizes the input data at box 52. In one embodiment, the data is statistically normalized by subtracting each cell variable mean and dividing by the standard deviation. The algorithm then transforms the normalized data to principal components using a pre-calculated characteristic transformation matrix at box 54. Any principle components suitable for the purposes described herein can be used, such as cell voltage, cathode stoichiometry, stack pressure, stack temperature, etc. The PCA pattern recognition algorithm transforms the matrix of inputs into a matrix of principal components that are orthogonal and uncorrelated, allowing for a number of techniques to quantify the data. The pattern recognition algorithm then calculates a Euclidean norm of the two most significant principle components of the transformed data to the median voltage response to a cathode flow pulse at box 56. Fuel cells with Euclidean norms above a certain threshold may be indicative of possible future instability. Also, the norm can be used with the Spearman rank correlation of the raw voltage data to form a region of normality, where cells with correlations and norms outside a certain range are decided to be abnormal.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining whether flow channels of a fuel cell in a fuel cell stack are flooded, indicating cell instability, said method comprising:
providing pulses of a cathode reactant gas flow to cathode flow channels within the fuel cell stack;
collecting data points of the voltage of each fuel cell in the fuel cell stack in response to the pulse of cathode reactant gas flow for a predetermined period of time;
using a pattern recognition algorithm to determine whether the collected data points indicate a voltage signature for each fuel cell identifying flooded cathode flow channels or non-flooded cathode flow channels; and
increasing how often the cathode air flow pulses are provided if the pattern recognition algorithm determines that one or more of the cells has flooded cathode flow channels.

2. The method according to claim 1 wherein determining whether any of the fuel cells have flooded cathode flow channels includes only determining whether any of the fuel cells have flooded flow channels if the current density of the stack is below a predetermined value.

3. The method according to claim 2 wherein the predetermined value of the current density of the stack is about 0.2 A/cm$^2$.

4. The method according to claim 1 wherein using a pattern recognition algorithm includes using a Spearman rank correlation pattern recognition algorithm.

5. The method according to claim 4 wherein using a pattern recognition algorithm includes correlating the data points to a median response voltage signature for all of the fuel cells in the fuel cell stack.

6. The method according to claim 1 wherein using a pattern recognition algorithm includes using a principle component analysis pattern recognition algorithm.

7. The method according to claim 6 wherein using a pattern recognition algorithm includes normalizing the data points, transforming the normalized data points to principle components and calculating a Euclidean norm of the principle components.

8. The method according to claim 7 wherein using a pattern recognition algorithm includes normalizing the data points by subtracting each data point mean and dividing by a standard deviation.

9. The method according to claim 7 wherein using a pattern recognition algorithm includes transforming the normalized data points using a predetermined characteristic transformation matrix.

10. A fuel cell system comprising:
a fuel cell stack including cathode flow channels;
a compressor for providing cathode inlet air to the cathode flow channels in the fuel cell stack; and
a controller for controlling how often cathode air flow pulses are provided to the cathode flow channels to remove water from the cathode flow channels, said controller collecting data points of the voltage output of each fuel cell in the fuel cell stack during a cathode air flow pulse and using a pattern recognition algorithm to determine whether the collected cell voltages indicate a voltage signature for flooded cathode flow channels or non-flooded cathode flow channels, said controller increasing how often the cathode air flow pulses from the compressor are provided if the pattern recognition algorithm determines that one or more of the cells has flooded cathode flow channels.

11. The system according to claim 10 wherein the controller determines whether any of the fuel cells have a flooded cathode flow channels only if the stack current density output is below a predetermined value.

12. The system according to claim 10 wherein the controller uses a Spearman rank correlation pattern recognition algorithm.

13. The system according to claim 12 wherein the Spearman rank correlation pattern recognition algorithm correlates the cell voltages to a median response voltage signature for all of the fuel cells in the fuel cell stack.

14. The system according to claim 10 wherein the controller uses a principle component analysis pattern recognition algorithm.

15. The system according to claim 14 wherein the controller normalizes the collected cell voltage outputs, transforms the normalized cell voltages to principle components and calculates a Euclidean norm of the principle components.

16. The system according to claim 15 wherein the controller normalizes the data points by subtracting each data point mean and dividing by a standard deviation.

17. The system according to claim 15 wherein the controller transforms the normalized data points using a predetermined characteristic transformation matrix.

18. A fuel cell system comprising:

a fuel cell stack including cathode flow channels;

a compressor for providing cathode inlet air flow pulses to the cathode flow channels in the fuel cell stack; and a controller for determining if any of the cathode flow channels are flooded using pattern recognition of cell voltages wherein the cell voltages are collected during the cathode inlet air pulses.

19. The system according to claim 18 wherein the controller uses Spearman rank correlation for the pattern recognition.

20. The system according to claim 18 wherein the controller uses principle component analysis for the pattern recognition.

* * * * *